Dec. 7, 1965    H. DEANS    3,222,239
ULTRASONIC SEALING SYSTEM
Filed March 30, 1961    6 Sheets-Sheet 1

INVENTOR.
HOWARD DEANS
BY
*Thomas Price*
ATTORNEY

INVENTOR.
HOWARD DEANS
BY
ATTORNEY

INVENTOR.
HOWARD DEANS
BY
ATTORNEY

United States Patent Office 3,222,239
Patented Dec. 7, 1965

3,222,239
ULTRASONIC SEALING SYSTEM
Howard Deans, Secane, Pa., assignor to Kleer-Vu
Industries, Inc., New York, N.Y.
Filed Mar. 30, 1961, Ser. No. 99,504
7 Claims. (Cl. 156—380)

The present invention relates to an ultrasonic sealing system and it particularly relates to a system for welding sheet or thin plastic materials.

It is among the objects of the present invention to provide an ultrasonic sealing system having a very high frequency which will rapidly and reliably seal together thin sheets of plastic material at a relatively high rate or production with a minimum of labor.

In accomplishing the above objects it has been found most satisfactory to cause substantial integral sealing of two or more thin sheet materials placed in superimposed relationship by the kinetic energy released internally in the material by the mechanical hammering action of a tool vibrating at very high frequencies in contact with a plastic, such vibrational velocity being preferably above 18,000 oscillations per second.

It is most important that the oscillatory rate be much above the audio-frequency rate to achieve the desired results, since in the audio-range with high powered outputs the device is commercially unsatisfactory.

In determining the best range to use, it has been found that the range just above audibility by about 20 to 30 kilocycles is most satisfactory.

In the preferred form of the device, the ultrasonic equipment consists of an electronic generator which produces the oscillatory electric energy of the proper frequency, combined with a transducer which converts the electrical energy into vibrating mechanical energy.

The driving or motor mechanism may desirably consist of a laminated metal stack having encircling energy coils to induce the high oscillatory rate.

Preferably, the main armature or core element consists of a nickel stack encircled by energy coils to which a high frequency alternating current source is applied, of the order of 25 kilocycles.

The entire motor is desirably enclosed in a casing having suitable supports and with suitable cooling means.

The lower part of the stack is connected to a suitable tool cone, which is a solid piece of metal in the shape of a cone whose large end is attached to the transducer.

The depending converging tip is desirably used as the hammering tool, with the actual contact end being limited to a very small, constricted or concentrated application area.

The transducer thus described is desirably of the magnetostrictive type, which has high efficiency due to the expansion and contraction of a nickel rod when subjected to a high frequency oscillatory magnetic field.

The actual amplitude at the constricted small application area is extremely limited and the power is of the high frequency to a very small area at which the pressure is concentrated.

In one preferred form the transducer and its attached cone is mounted perpendicular to a solid base or anvil and the overlapped plastic films to be bonded are hammered by the tool against the anvil.

The tool tip is so designed that there will be an extreme concentration of energy at its point of application to the two, three or more layers of film to be bonded together.

The transducer and tool desirably is loaded to weigh a few pounds, while the actual weld pressure produces a pressure in the order of 1000 pounds per square inch or more over and in a very small, compact area.

Where two edges of plastic are to be joined together, they may be first butted against one another and then overlapped slightly, usually from .010 inch to .030 inch, with the axis of the cylinder tip being perpendicular to the narrow lap.

The actual amount of oscillation is in the neighborhood of .001 to .002 of an inch.

The vertical oscillatory transducer is desirably supported so as to permit a linear motion with a minimum of friction, which will permit the oscillatory concentrated tip of the tool to penetrate into the plastic as the fusion occurs.

In one form, arms and ball bearings are utilized for supporting the transducer housing to give a parallelogram-type of suspension, which is adequate for the small motions required.

As an alternative form of support the transducer may be mounted in a tube moving freely within a ball bearing and giving a free linear motion to the assembly.

Desirably, the device also includes a counterweight to balance out the weight of the transducer, which may be accomplished by using a weighted transducer housing and a counterweighted lever frame, the weight of which may be adjustable by adding or substracting weight or providing a manner of sliding weights along the arm in a scale fashion.

Desirably, for compactness, separate adjustable springs may be employed to give the weight application, one spring pushing upward on the parallelogram suspension system to counter the weight of the transducer assembly; the other spring pushing downwardly and being provided with a screw adjustment to vary the amount of downward pressure.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
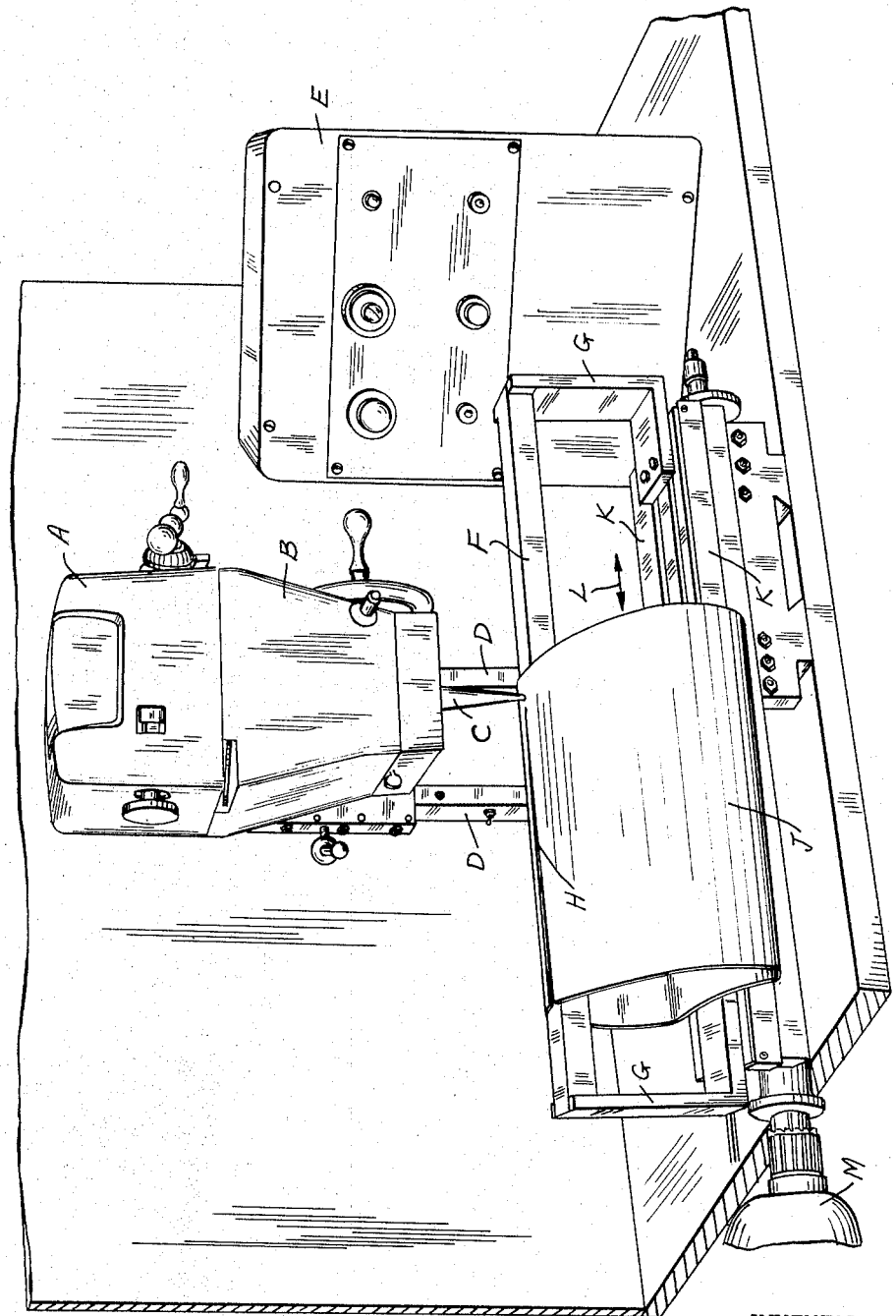
FIG. 1 is a side perspective view of the complete ultrasonic assembly, according to the present invention.

Referring to FIG. 1, there is shown a transducer head assembly A having a divergent lower housing portion B carrying the dependent conical tool C.

The housing A is supported upon the uprights D. The driver unit E is of the 25 kilocycle type.

There is shown by way of example in the embodiment of FIG. 1 a long bar anvil F having the end supports G from which the bar F may be lifted.

The lower end of the tool C is shown as forming a seal at H in the Mylar or polyethylene terephthalate belt J.

The entire unit of the bar anvil F and side supports G may be moved on the slideways K in the direction L under the anvil.

A suitable driving arrangement is shown fragmentarily at M at the left of FIG. 1.

Figure 2:
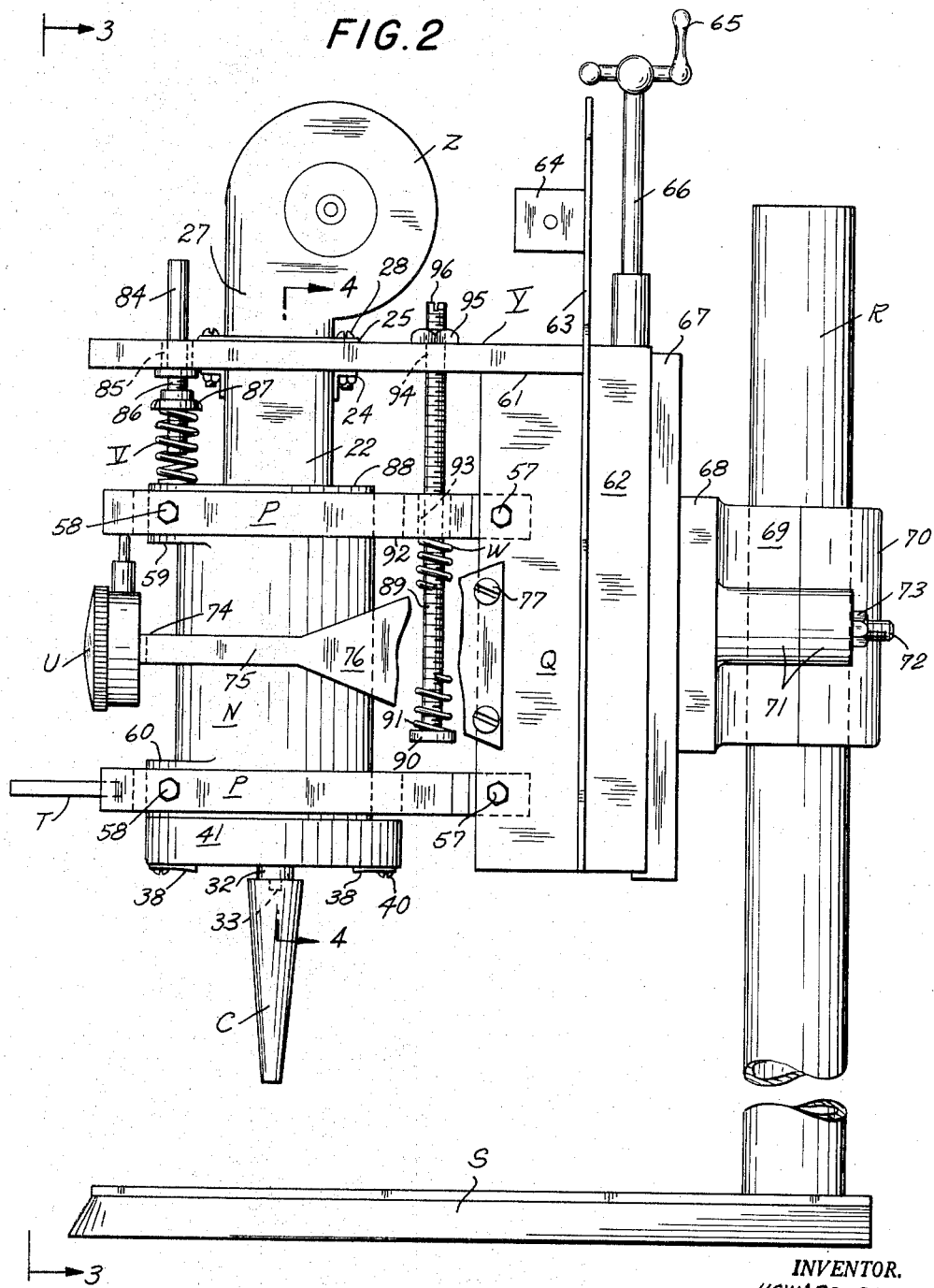
FIG. 2 is a side elevational view of the transducer, with the depending conical tool supported upon a stand.

Referring to FIG. 2, which shows the interior of the structure inside of the housing A–B of FIG. 1, there is provided a transducer housing N, from which projects downwardly the tool C.

There is provided a parallelogram suspension P mounted upon the vertical structural members Q.

Figure 3:
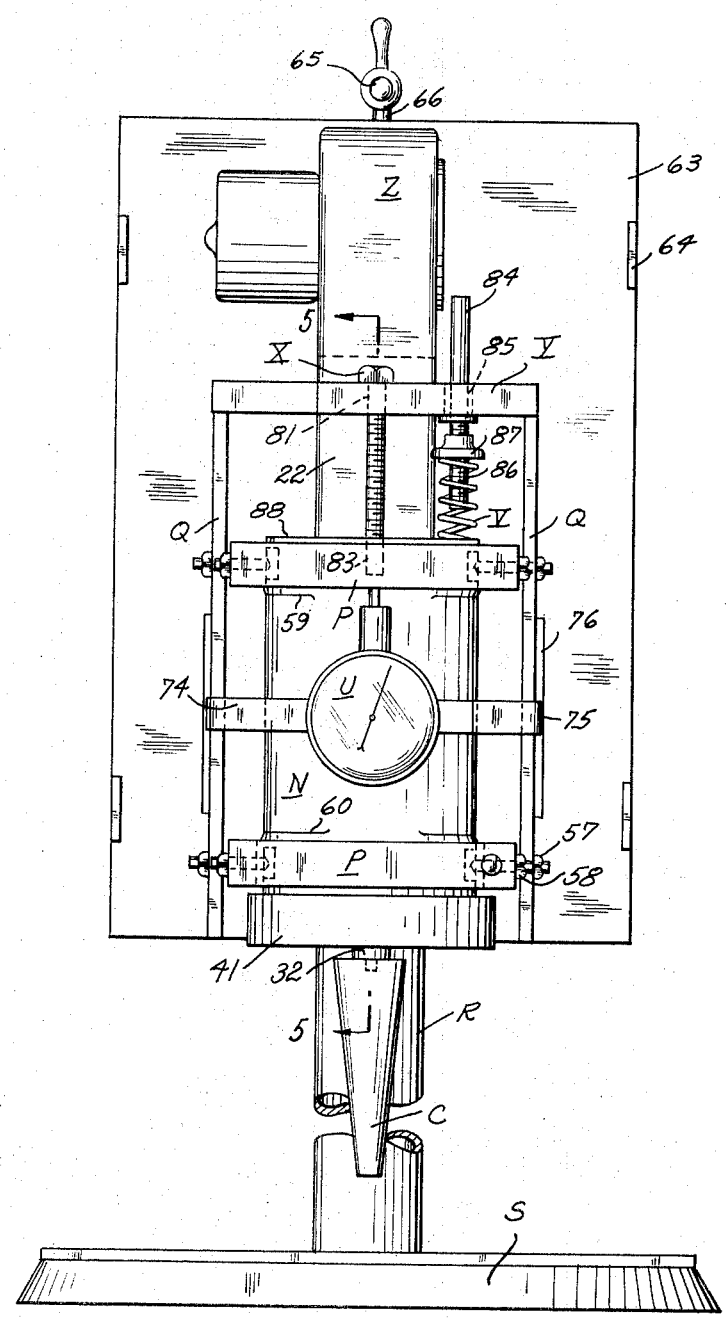
FIG. 3 is a front elevational view of the unit of FIG. 2, taken from the line 3—3 of FIG. 2.

The structural members Q are supported on a vertical tubular member R, which in turn is supported on a stand S, which, in the embodiment of FIGS. 2 and 3, forms an anvil.

In the embodiment of FIGS. 2 and 3, there is shown a hand lift T, a dial gauge U and a weight loading spring V.

The counterbalance spring W is positioned in the rear of the device.

There is also provided a vertical motion stop X.

On the top suspension plate Y the fan or blower Z will supply cooling air.

Figure 4:
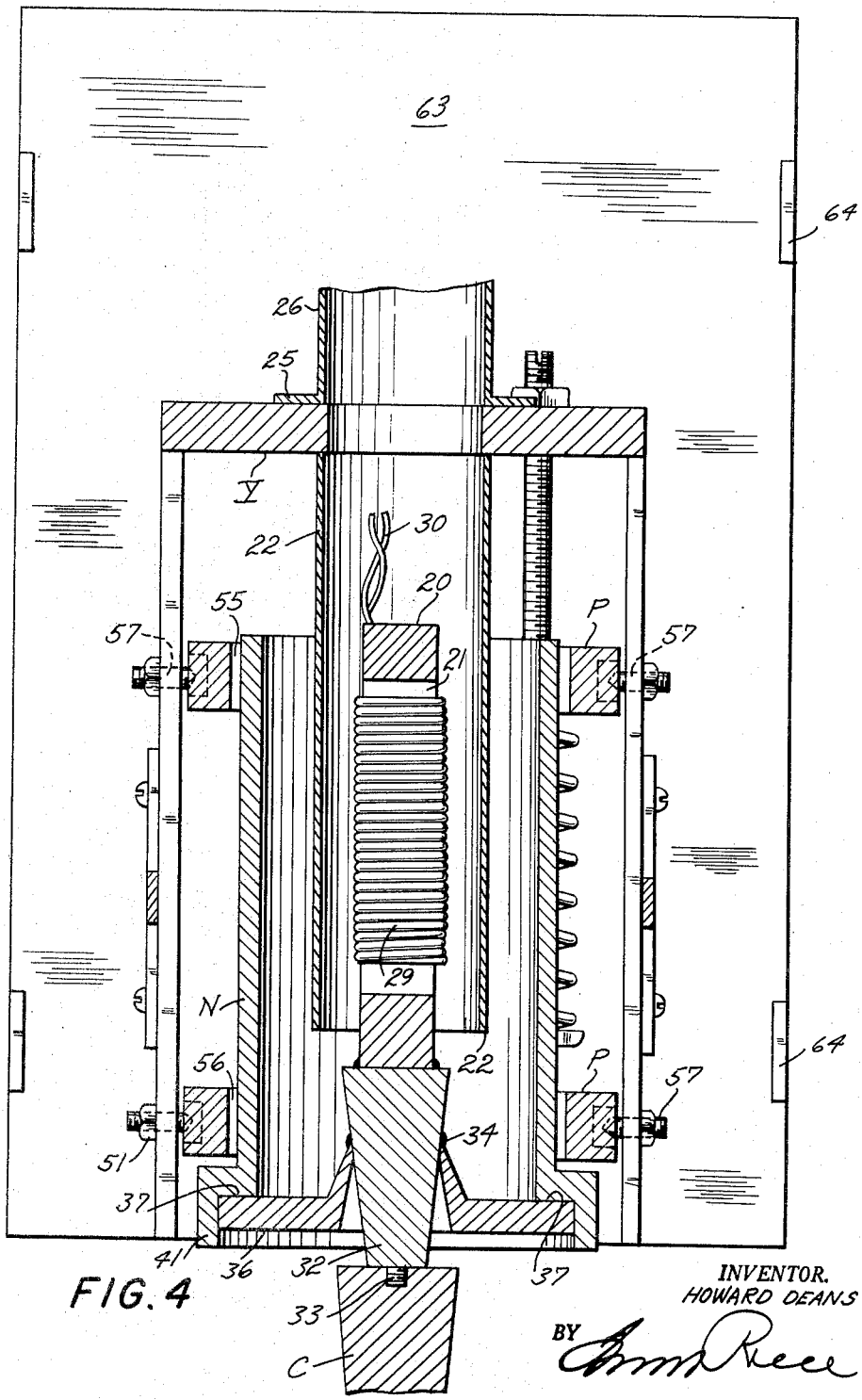
FIG. 4 is a transverse vertical sectional view, taken upon the line 4—4 of FIG. 2.
Figure 5:
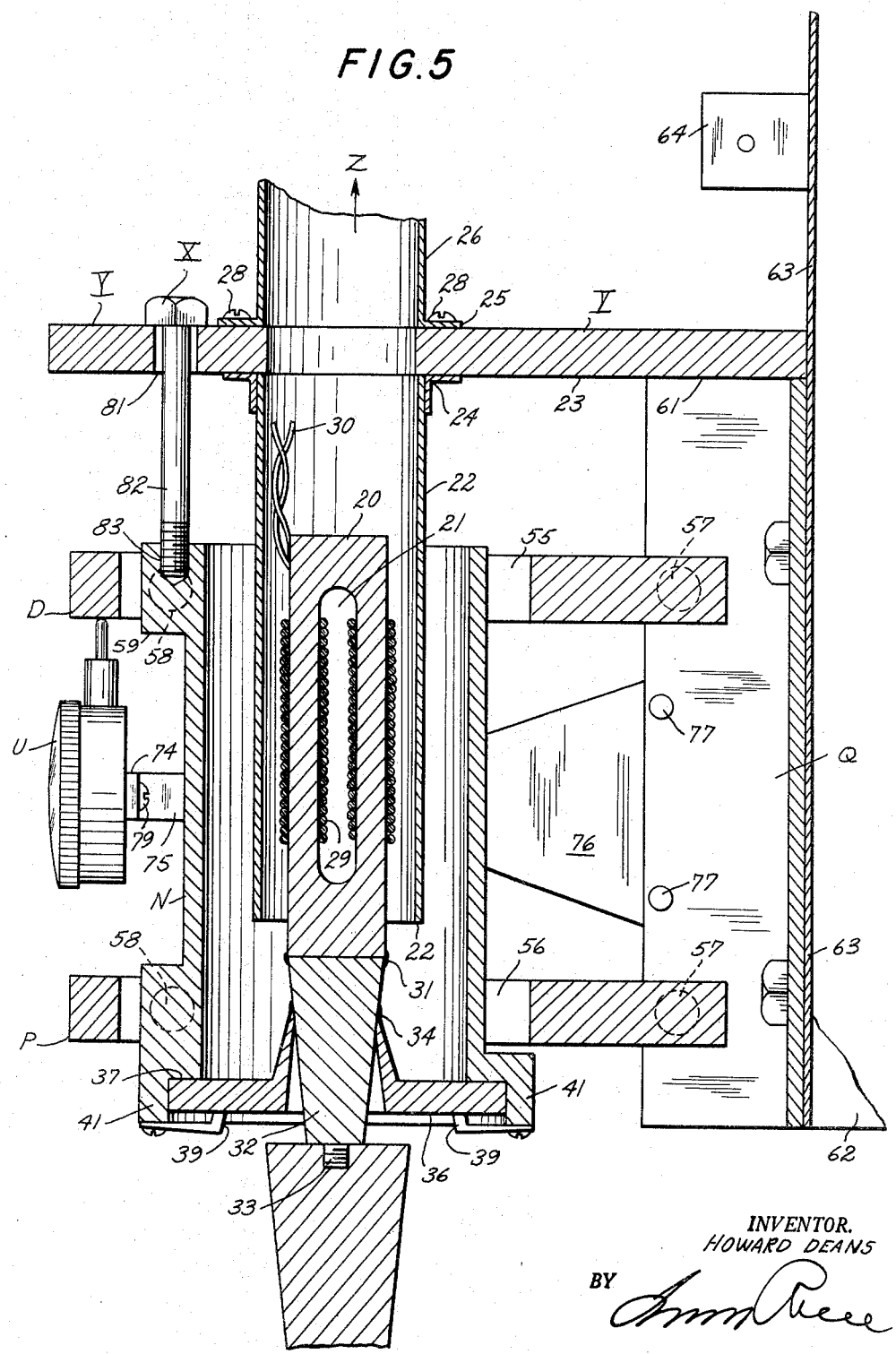
FIG. 5 is a transverse vertical sectional view, taken upon the line 5—5 of FIG. 3.
Figure 6:
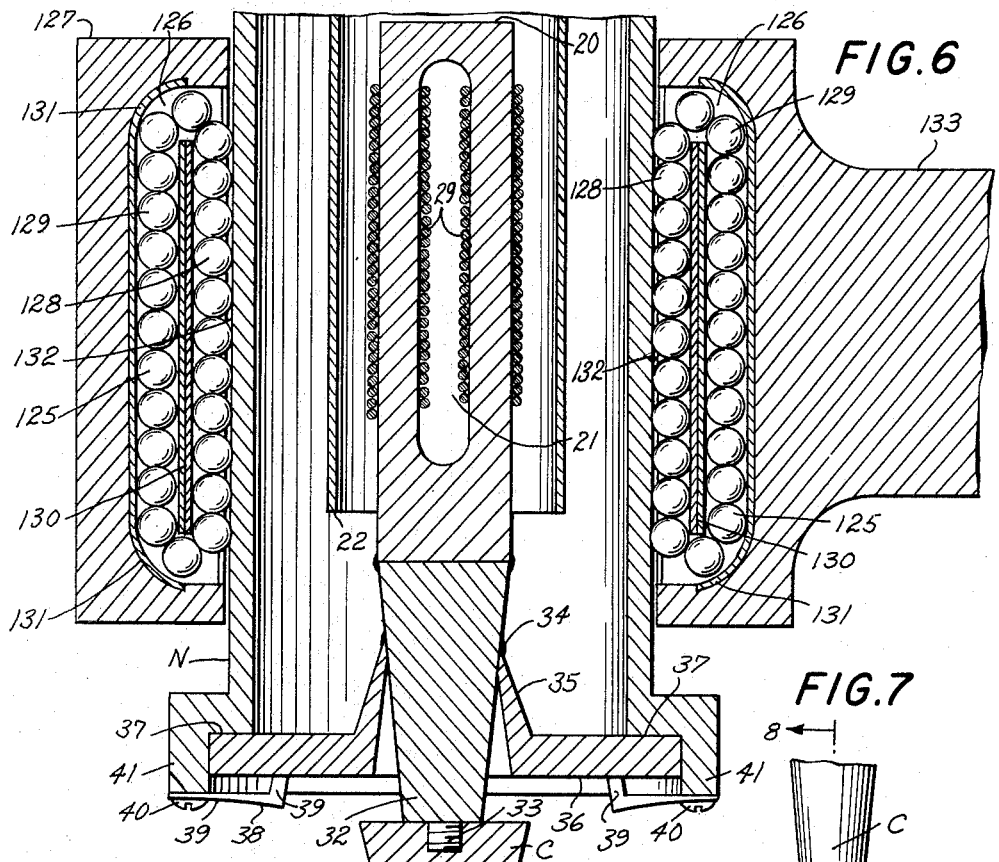
FIG. 6 is a fragmentary transverse sectional view of the transducer element at an angle of 90° to that shown in FIG. 6, showing the ball bearing support and the bifurcated structure of the laminated nickel pile.

In FIGS. 4, 5 and 6 is shown in detail the interior structure of the transducer element.

The interior structure has a laminated nickel stack 20 enclosed in the cooling air directing tube 22, which extends up to and abuts the lower face 23 of the suspension plate Y.

This tube is held in position by a flanged ring 24, which is connected to the bottom face 23 of the suspension plate Y.

The suspension plate Y also carries the lower flanged end 25 of the tube 26, which is connected to the lower end 27 of the cooling blower Z.

The flange is connected in position by the screws or bolts 28.

The laminated nickel stack is encircled by a coil 29, which has the feed wires 30.

The structure 20 at its lower end has a brazed connection at 31 to the depending conical transmission 32, desirably of Monel metal.

The lower end of the transmitting cone 32 has a threaded stud connection 33 to the tool cone C.

To the upper sides of the transmitter element 32 and 34 (see FIGS. 3, 4 and 5) is brazed the upstanding conical structure 35 of the brass nodal support disc for the transducer.

This brazing point 34 is desirably located at the exact nodal point of vibration.

The support discs are held against the shoulders 37 by means of the spring clips 38, the inside legs 39 of which abut the lower face of the disc and the outer thin ends of which are held in position by the screws 40 on the depending cylinder element 41 of the transducer casing N.

The main parallelogram suspension arms P have openings 55 and 56 through which the tubular transducer housing extends.

These arms are provided with suspension arm bearings and needle screws 57 inside of the structural elements Q, as well as similar suspension bearings and needle screws at the forward ends thereof at 58. (See FIGS. 2 and 5.)

Normally, at the point 57 there will be a ball bearing in the arm and a needle screw in the frame, while at 58 the ball bearing will be in the casing and the needle screw will be in the arm.

The connections to the casing will be in the enlarged or projecting ears indicated at 59 and 60 in FIGS. 2 and 3, which will enable the arms P to carry the forward side of the housing end away from the vertical support tube R.

The upper suspension plate Y is mounted at 61, as shown in FIGS. 2 and 5, to the channel shaped structure formed by the side members Q, which in turn are mounted on the vertical sliding structure 62, which has the rear plate 63 and the casing support locks 64. (See FIGS. 2 and 5.)

In back of the plate 63 will be based the slideway structure 62, which may be moved up and down by means of a crank 65 on the top of the rod 66. (See FIG. 2.)

The slideway also has the rear step members 67 and 68 (see FIG. 2) terminating in the pipe clamp elements 69 and 70 which form a split encircling cylinder having outwardly projecting ears 71 on the side thereof, as shown in FIG. 2.

These ears are clamped together by means of the bolt 72 and the nut 73.

The dial gauge U, as shown in FIG. 3, is mounted upon the cross-frame member 74, which has the side elements 75 extending rearwardly to the widened portion 76 screwed in position at 77 upon the side plates Q. (See FIGS. 2 and 3.)

The cross-member 74 is attached to the back 78 of the gauge U by the screws 79.

The adjustable screw stop structure X shown in FIGS. 3 and 5 extends through an opening 81 in the suspension plate Y.

The lower threaded end of the element X screws into the tapped opening 83 in a projecting portion 59 at the upper end of the tubular transducer housing N.

This screw will act as a stop for downward motion of the suspension system.

The weight loading spring V is supported on a vertical rod 84 (see FIGS. 2 and 3), which extends at 85 through the upper plate Y and has a threaded portion 86 carrying the top adjustment plate 87.

The lower end of the spring V reacts against the top face 88 of the transducer housing N and the pressure of the spring may be varied by adjusting the position of the pressure member 87.

This spring will give a weight loading.

The counterbalance spring W at the rear, as shown best in FIG. 2, encircles the threaded vertical member 89, which has a lower head 90 against which the lower end 91 of the spring reacts.

The upper end of the spring reacts against the lower face 92 of the upper parallelogram suspension bar P.

This threaded rod 89 extends through the upper member P at 93 and then through the suspension plate Y at 94 and is held in adjusted position by the nut 95.

The upper end of the bar 89 has a fillister slot 96.

The spring W will normally be in adjusted compression, depending upon the position of the nut 95.

The sides of the transducer may alternately be supported or guided by the continuous ball bearings 125 received in the recesses 126 in the encircling structure 127, having an arm support 133.

In this case the inner row of ball bearings 128 and the outer row of ball bearings 129 are separated by the intermediate plate 130 and the balls rotate inside of the casing 131.

The balls will contact the faces 132 of the outside of the transducer housing end, guided in this reciprocatory vertical movement.

Figure 7:
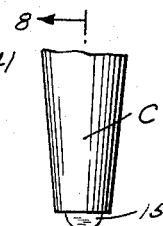
FIG. 7 is a diagrammatic side elevational view, taken upon an enlarged scale as compared to FIGS. 1 to 6, showing a side view of the tip of the tool being applied to an overlapping weld against a lower anvil.
Figure 8:
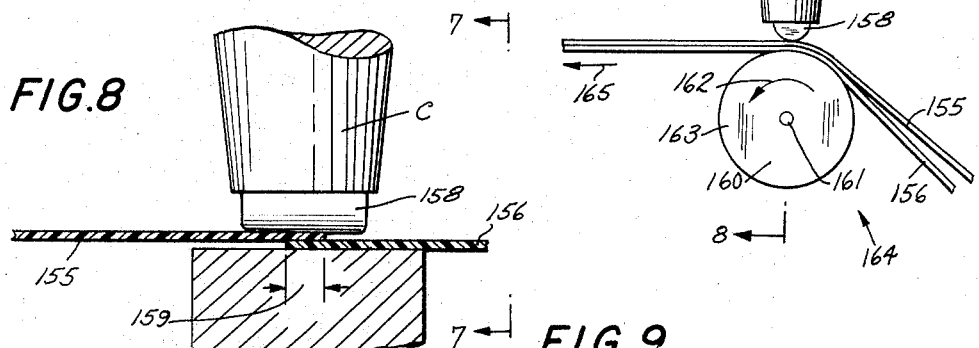
FIG. 8 is a side elevational view taken upon the line 8—8 of FIG. 7 and upon an enlarged scale as compared to FIG. 7.

In FIGS. 7 and 8 is shown how an overlap weld is formed.

Two thin sheets of plastic material 155 and 156, usually of nylon, polyethylene terephthalate or Mylar (¼ mil to 10 mils), or polyethylene coated Mylar or polyvinyl chloride or polypropylene or polyethylene, are fed transversely to the cylindrical edge 158 at the lower end of the tool C.

This overlap may have a width of .010 to 0.30 inch, as indicated at 159 in FIG. 8.

The driving wheel 160 being driven on the axis 161 in the direction 162 may have a knurled or roughened face 163 to drive the films 155 and 156 before sealing at the position of the arrow 164, and after sealing at the position 165.

Figure 9:
FIG. 9 is a side elevational view upon an enlarged scale, showing the final weld that is achieved.

The resultant seal that will be formed is indicated in FIG. 9 with the lapped area being extended, as indicated at 166, and the sealed material being indicated as extending obliquely at 167 across the seal between the two sheets or strips 155 and 156.

Desirably in the embodiment shown, the tool will stand still while the material is moved therebelow and the sealing may be accomplished with either a thermoplastic sheet or by reason of a thermoplastic coating upon thin sheets of metal, paper or other materials not subject to ultrasonic sealing.

The important feature is to have an oscillatory rate of over 18000 cycles per second, with an optimum at 25000 cycles.

The process is not particularly satisfactorily applied to cellophane, nor to synthetic or natural sheet rubber, nor to Teflon.

It may be used for making tubing, sleeves, bags, envelopes and for attaching various synthetic fabrics or clothing articles without stitching. It is also applicable to woven nylon, Dacron or Orlon, but desirably wool blends should be avoided.

The device may be used for folding without sealing with a pressure of two to four pounds or for sealing with a pressure of six to eight pounds and, depending upon the shape of the tool, it may also be used for cutting.

The power generator E shown in FIG. 1 is desirably of the 25 kilocycle type.

In general, the tool vibrates in a vertical motion and the welding depends upon the hammering of the two sandwiched plastic materials together against a solid anvil.

The solid anvil must have sufficient mass to absorb ultrasonic energy.

As many changes could be made in the above ultrasonic sealing system, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. An ultrasonic sealing device for thermoplastic sheet materials comprising a housing, a vertical driving member within the housing, coils encircling said member, a source of high frequency alternating current energy applied to the coils, a depending inverted conical tool having a small constricted application area at the lower end thereof, an anvil against which said area presses said sheet materials, said driving member consisting of a laminated nickel stack structure provided with a plurality of parallel encircling energizing coils, an intermediate tubular member encircling said driving member between said driving member and said housing to supply cooling air thereto, a vertical standard at one side of said anvil and a counter balanced parallelogram suspension between said standard and said housing and an adjustable vertically positioned coil spring counterbalancing means to hold up said driving member and said tool so that only the energy of the ultrasonic vibration of the tool will be applied to the plastic sheet materials without effect of the weight of the driving member.

2. An ultrasonic sealing device for thermoplastic sheet materials comprising a housing, a vertical driving member within the housing, coils encircling said member, a source of high frequency alternating current energy applied to the coils, a depending inverted conical tool having a small constricted application area at the lower end thereof, an anvil against which said area presses said sheet materials, said housing being provided with a weight loading spring at one side and a counterbalance vertical coil spring at the other side and manual means to adjust the contact between the lower end of the conical head and the anvil and said counterbalance spring being provided to react against said suspension and hold it balanced against the weight of the driving member and tool.

3. An ultrasonic plastic sealing device comprising a flat horizontal base having an upper face constituting an anvil, a vertical standard extending upwardly from one side of said anvil, a movable vertically adjustable clamp positioned on said vertical standard, a vertical support mounted on said clamp, a top horizontal fixed support plate extending outwardly from said vertical support, two pairs of parallel swinging support arms extending outwardly from and mounted pivotally at the side of the vertical support, an upper pair being mounted on said support below the plate at an intermediate portion of the support and a lower pair being mounted on the support at the lower end of the support, a housing positioned between the pairs of support arms and pivotally connected to the outer ends of the support arms, a vertical driving member within the housing, coils encircling said member, a source of high frequency alternating current energy applied to the coils, a depending inverted conical head having a small constricted application area at the lower end thereof, connecting means between the driving member and the conical head, counterbalancing means associated with the housing and the driving member to counterbalance the weight of said housing and driving member and manual means to adjust the contact between the lower end of the conical head and the anvil, said counterbalancing means including a spring pressing downwardly upon the housing and another spring pressing upwardly on the upper pair of arms.

4. An ultrasonic plastic sealing device comprising a flat horizontal base having an upper face constituting an anvil, a vertical standard extending upwardly from one side of said anvil, a movable vertically adjustable clamp positioned on said vertical standard, a vertical support mounted on said clamp, a top horizontal fixed support plate extending outwardly from said vertical support, two pairs of parallel swinging support arms extending outwardly from and mounted pivotally at the side of the vertical support, an upper pair being mounted on said support below the plate at an intermediate portion of the support and a lower pair being mounted on the support at the lower end of the support, a housing positioned between the pairs of support arms and pivotally connected to the outer ends of the support arms, a vertical driving member within the housing, coils encircling said member, a source of high frequency alternating current energy applied to the coils, a depending inverted conical head having a small constricted application area at the lower end thereof, connecting means between the driving member and the conical head, counterbalancing means associated with the housing and the driving member to counterbalance the weight of said housing and driving member and manual means to adjust the contact between the lower end of the conical head and the anvil, said top plate carrying a blower cooling means.

5. An ultrasonic plastic sealing device comprising a flat horizontal base having an upper face constituting an anvil, a vertical standard extending upwardly from one side of said anvil, a movable vertically adjustable clamp positioned on said vertical standard, a vertical support mounted on said clamp, a top horizontal fixed support plate extending outwardly from said vertical support, two pairs of parallel swinging support arms extending outwardly from and mounted pivotally at the side of the vertical support, an upper pair being mounted on said support below the plate at an intermediate portion of the support and a lower pair being mounted on the support at the lower end of the support, a housing positioned between the pairs of support arms and pivotally connected to the outer ends of the support arms, a vertical driving member within the housing, coils encircling said member, a source of high frequency alternating current energy applied to the coils, a depending inverted conical head having a small constricted application area at the lower end thereof, connecting means between the driving member and the conical head, counterbalancing means associated with the housing and the driving member to counterbalance the weight of said housing and driving member and manual means to adjust the contact between the lower end of the conical head and the anvil, said pairs of arms constituting a parallelogram suspension system and said counterbalancing means including one spring pressing upwardly on the upper pair and another spring pressing downwardly on the housing and a screw adjustment to vary said pressure.

6. An ultrasonic sealing apparatus for sealing together thin overlapping plastic sheets comprising a fixed anvil to carry the sheets, a depending vertical ultrasonic vibrating tool positioned above the anvil, a driver for said tool carrying the tool at the lower end thereof, means to counterbalance said tool to relieve the weight of the tool and driver upon the sheets on the anvil, a vertical standard to carry said tool, a vertically adjustable sliding member on said standard and parallel upper and lower pairs of arms positioned on each side of said driver to lift and lower said tool to contact said sheets and pivotal mounts for said arms on said sliding members, said means to counterbalance consisting of means to balance out the weight of the driver and an adjustable spring pushing downwardly on said arms to control the amount of downward pressure and a screw adjustment on the spring to vary said downward pressure.

7. An ultrasonic sealing apparatus for sealing together thin overlapping plastic sheets comprising a fixed anvil to carry the sheets, a depending vertical ultrasonic vibrating tool positioned above the anvil, a driver for said tool carrying the tool at the lower end thereof, means to counterbalance said tool to relieve the weight of the tool and driver upon the sheets on the anvil, a vertical standard to carry said tool, a vertically adjustable sliding member on said standard and parallel upper and lower pairs of arms positioned on each side of said driver to lift and lower said tool to contact said sheets and pivotal mounts for said arms on said sliding members, fixed horizontal frame members and parallel vertically positioned coil springs acting between the arms and the frame members to counter the weight of the driver and tool and to vary the amount of downward pressure and screw adjustments for said springs to vary the strength thereof.

References Cited by the Examiner
UNITED STATES PATENTS

| | | | |
|---|---|---|---|
| 2,633,894 | 4/1953 | Carwile | 154—42 |
| 2,651,148 | 9/1953 | Carwile. | |
| 2,814,167 | 11/1957 | Nichols et al. | 51—59 |
| 2,946,119 | 7/1960 | Jones. | |
| 2,946,120 | 7/1960 | Jones. | |
| 2,985,854 | 5/1961 | Jones. | |
| 2,991,594 | 7/1961 | Brown et al. | 51—59 |
| 3,022,814 | 2/1962 | Bodine | 156—73 |

FOREIGN PATENTS

| | | |
|---|---|---|
| 250,121 | 3/1959 | Japan. |

EARL M. BERGERT, *Primary Examiner.*

CARL F. KRAFFT, *Examiner.*